(12) United States Patent
Barrett et al.

(10) Patent No.: US 6,782,420 B1
(45) Date of Patent: Aug. 24, 2004

(54) TELECOMMUNICATIONS NETWORK WITH A DISTRIBUTIVE NETWORK MANAGEMENT SYSTEM

(75) Inventors: Gary Raymond Barrett, Naperville, IL (US); Michael P. Foley, Elmwood Park, IL (US); Kurt A. Vangsness, Aurora, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/321,483

(22) Filed: May 27, 1999

Related U.S. Application Data (63) Continuation-in-part of application No. 09/088,463, filed on May 31, 1998, now Pat. No. 6,363,421.

(51) Int. Cl.[7] .................. G06F 15/16; G06F 15/177; G06F 13/00
(52) U.S. Cl. .................. 709/223; 709/202; 709/208; 719/316
(58) Field of Search .................. 709/202, 223, 709/224, 203, 201, 316, 227, 208; 370/352

(56) References Cited

U.S. PATENT DOCUMENTS

| | | | | |
|---|---|---|---|---|
| 5,887,139 A | * | 3/1999 | Madison, Jr. et al. | 709/233 |
| 6,134,581 A | * | 10/2000 | Ismael et al. | 709/202 |
| 6,335,927 B1 | * | 1/2002 | Elliott et al. | 370/352 |
| 6,349,333 B1 | * | 2/2002 | Panikatt et al. | 709/223 |
| 6,363,421 B2 | * | 3/2002 | Barker et al. | 709/223 |
| 6,393,386 B1 | * | 5/2002 | Zager et al. | 703/25 |
| 6,445,776 B1 | * | 9/2002 | Shank et al. | 379/88.1 |
| 6,487,590 B1 | * | 11/2002 | Foley et al. | 709/223 |
| 2001/0032256 A1 | * | 10/2001 | Sondur et al. | 709/223 |

OTHER PUBLICATIONS

Cherkaoui et al., Towards a modular and interoperable SNMPv3, IEE, 5856812.*

* cited by examiner

Primary Examiner—Paul Kang (57) ABSTRACT

A telecommunications network(10) having a distributive network management system(20) for remotely managing the plurality of network elements(38) has a management computer, or work station(22) with a management program communicating through the Internet by via managed object commands. An element management server(24) communicates through the computer Internet with the plurality of network elements(38) via a simplified network management protocol, or SNMP, to communicate management information concerning the plurality of network elements(38). The managed objects are responsive to managed object commands from the management computer(22) to provide the management information to the management program and to take actions as directed. Commands are composed in EMAPI notation to render them independent of any protocol used between the element manager server(24) and the managed network elements(38). Communications between the management computer(22) and the element manager server (24) utilizes CORBA.

39 Claims, 7 Drawing Sheets

| Step | Description |
|---|---|
| 1 | Client application invokes managed object method corresponding to the command |
| 2 | Managed Object (MO) instantiates a command object |
| 3 | Command object sets and acknowledgment timer |
| 4 | Command object queues itself with the EMS Command Handler |
| 5 | Command object requests a sequence number for the command... |
| 6 | ...and combines it with session ID to form a unique command ID |
| 7 | After command instantiation, MO defers the rest of command processing to the command object |
| 8 | Command object registers an acknowledgment filter on behalf of the client application |
| 9 | Command object does the same for a response filter |
| 10 | Input command info passed to managed object |
| 11 | Managed object invokes Mediator (in this case SNMP) with the command info |
| 12 | SNMP set request is made (for SNMP based network elements) |
| 13 | Command object returns control to the MO with the command sequence number |
| 14 | MO sends the command sequence number back to the client application |
| 15 | After some time, the acknowledgment trap arrives (within 10 seconds or timeout will occur) |
| 16 | It is reformatted into an EMAPI event by the mediator and sent to the Event Screener, which looks for matching filters |
| 17 | The Command Handler has a filter matching all ack / response events so the event is delivered to it |
| 18 | The Command Handler searches its queue for a Command object with a matching command ID, then has that object process the ack by adding input command information to the event |
| 19 | The Command object cancels the acknowledgment timer |
| 20 | The Command object sets a response timer |
| 21 | The Command object passes the event on to the Event Distributor which looks for matching filters |
| 22 | The Event Distributor finds the client application's filter and invokes the client's callback |
| 23 | The Command object removes the client's ack filter and awaits further events |
| 24 | After some time, the response trap arrives at the SNMP Mediator which transforms it into an EMAPI event |
| 25 | The Mediator forwards the event to the Event Screener which looks for matching filters |
| 26 | The Command Handler has a filter matching all ack / response events so the event is delivered to it |
| 27 | The Command Handler searches its queue for a Command object with a matching command ID, then has that object process the response by adding input command information to the event |
| 28 | The Command object cancels its response timer because the final response has been delivered |
| 29 | The Command object passes the event on to the Event Distributor which looks for matching filters |
| 30 | The Event Distributor finds the client application's filter and invokes the client's callback |
| 31 | Since this is the final response, the Command object removes the client's response filter |
| 32 | The Command object dequeues itself from the Command Handler |
| 33 | The Command object deletes itself (by calling CORBA::release()) |

TELECOMMUNICATIONS NETWORK WITH A DISTRIBUTIVE NETWORK MANAGEMENT SYSTEM

CROSS REFERENCE TO RELATED APPLICATION

This application is a continuation-in-part of U.S. patent application Ser. No. 09/088,463, filed on May 31, 1998, now U.S. Pat. No. 6,363,421, entitled "METHOD FOR COMPUTER INTERNET REMOTE MANAGEMENT OF A TELECOMMUNICATION NETWORK ELEMENT" and assigned to the assignee of the present application, the contents of which are hereby incorporated herein.

BACKGROUND OF THE INVENTION

This invention generally relates to a telecommunication network and, more particularly, to a telecommunications network with a system for remotely managing elements of the network by means of commands sent through the network.

The present inventors have determined that known management systems for telecommunications networks disadvantageously require the use of special communications protocols that are not well adapted to distributive management. In known management systems, such as simple management network protocol (SNMP) response indications to command requests cannot be correlated to the original forward request and commands are sent only in accordance with a single process or from only a single processor. The commands are dependent on the protocol used between the manager and the target element to be controlled. Moreover, known management systems are cumbersome to use in that only simple commands are permitted which have a single action unconditionally commanded and a single response.

SUMMARY OF THE INVENTION

In accordance with the present invention, the disadvantages of the telecommunications networks known management systems having the limitations and disadvantages noted above are overcome by provision of a distributive management system for remotely managing a telecommunications network having a plurality of network elements.

In accordance with the invention this is achieved by supporting command execution in a distributed environment. With respect to one aspect of the invention commands can be composed in a different process or processor by utilizing CORBA or CORBA-like communication. Commands are independent of the protocol used between the managing computer and the element being controlled. Preferably, the commands are composed in EMAPI notation and the target protocol is SNMP.

In accordance with another aspect of the invention the efficiency of the management system is enhanced by supporting construction of complex commands which include response-conditional commands in a sequence of commands. Execution of some of the commands in a hierarchical sequence of commands are dependent upon the indicated result of attempted execution of one or more higher order or earlier commands in the sequence.

In the preferred embodiment, a telecommunications network having a plurality of network elements is provided with a distributive network management system for remotely managing the plurality of network elements. Preferably, the distributive management system of the present invention comprises a management computer with a management program and means for enabling communications through a computer Internet by the management program of managed object commands and an element management server. The element management server is a server on the computer Internet and has at least one managed object in communication through the computer Internet with the plurality of network elements via a simplified network management protocol to communicate management information concerning the plurality of network elements. The managed objects are responsive to the managed object commands from the management computer to provide management information to the management program and to take actions as directed.

In the preferred embodiment the commands are composed in EMAPI notation to render them independent of any protocol used between the element manager and the managed network elements. The managed network elements employ an SNMP protocol, and communications between the management computer and the element manager server utilizes CORBA.

In keeping with another important aspect of the invention, complex commands are supported. The element server receives and stores a chain of commands including at least one contingent command, determines the results of at least one of the commands, based upon determined results selectively taking action in accordance with the results of the at least one of the commands.

The managed object commands received from the management computer are automatically converted into a corresponding set commands of the simplified network management protocol. An event distributor provides filtering, routing and distribution of simplified network management protocol traps, commands, command acknowledgments and command responses. An alarm manager provides an indication of current active alarms within the plurality of network elements.

Preferably, the element management server generates an interactive web page with a graphic user interface with the at least one managed object for transmission to and display at the management computer. The web page which utilizes a JAVA applet communicating with the element manager via an element management application programming interface (EMAPI) utilizing CORBA has a menu of individual maintenance unit command options and includes a system status summary page for each managed network element. The web page also preferably includes a list of active alarms for the plurality of network elements.

BRIEF DESCRIPTION OF THE DRAWINGS

The foregoing advantageous features of the invention will be described in detail and others will be made apparent from the detailed description of the preferred embodiment of the invention that is given with reference to the several figures of the drawing, in which:

FIG. 5 is a listing of the numbered activities of FIG. 4;

DETAILED DESCRIPTION

Figure 1:
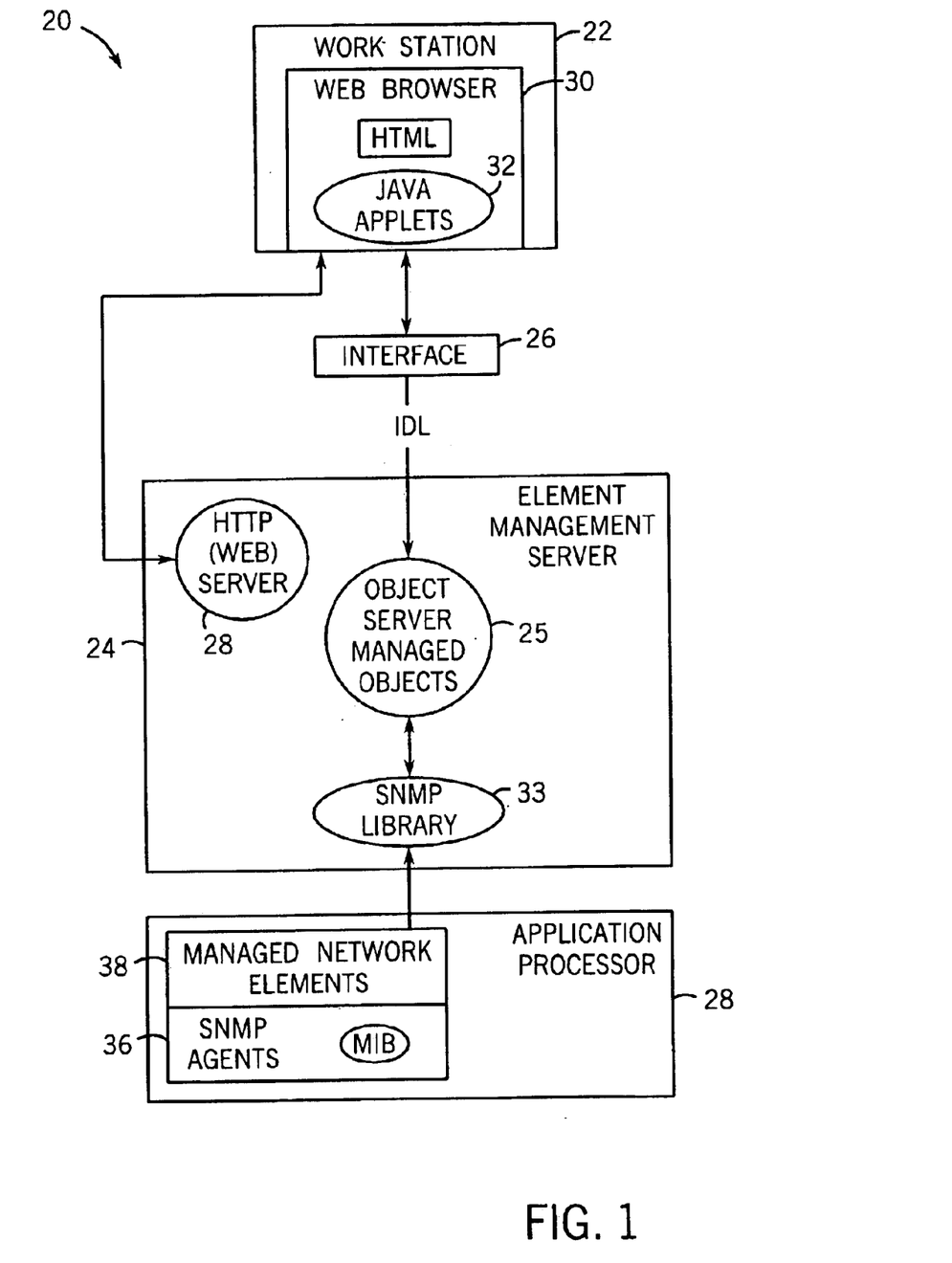
FIG. 1 is a functional block diagram of the preferred embodiment of the distributive telecommunications network management system of the present invention.

This invention provides an application programming interface (API) and protocol that provides for efficient communication between a distributed client application and an element management server independent of the communication protocol to the network element. An Element Management Application Programming Interface (EMAPI) provides benefits over known management systems as noted above. The invention has application in the management of a telecommunication network element. For more information regarding such a telecommunication network element management system reference should be made to commonly owned U.S. patent application Ser. No. 09/088,463, now U.S. Pat. No. 6,363,421, entitled "Method for Computer Internet Remote Management of a Telecommunication Network Element" by William E. Barker, Lisa M. Connelly, Marvin A. Eggert, Michael P. Foley, Kenneth R. Macfarlane, Philip M. Parsons, Girish Rai, Jerome E. Rog, and Kurt A. Vangsness, filed on May 31, 1998, of which this application is a Continuation-In-Part. Reference should also be made to our co-pending application of Michael P. Foley and Kurt a Vangsess entitled "Method For Controlling A Network Element From A Remote Workstation" filed Oct. 30, 1998, with U.S. Ser. No. 09/184,101, now U.S. Pat. No. 6,487,590, which is also hereby incorporated by reference. Referring now to FIG. 1, the invention is employed in an operations, administration and maintenance system 20 as that is part of a telecommunication network shown in FIG. 1. The system 20 includes a management computer, or workstation, 22, an element management server (EMS) 24, an interface in accordance with the invention 26, located between the workstation 22 and an object server 25. An application processor 28 is connected to the element management server 24.

The workstation 22 includes a web browser 30 which is the interface to the client and is a host for JAVA applets 32 and web browser HTML 35 which is a hypertext markup language.

The system 20 operates on a cluster computing environment, and leverages off-the-shelf technology to enable additional features with minimal increased cost. System 20 is provided through the web browser interface and a SNMP based element management platform.

A client executes applications via web pages at the workstation 22. The client makes requests for various views of the network status by making selections through the web browser 30. The web browser 30 requests pages from the web server 28. The web server 28 responds by transmitting HTML pages that contain instructions to load and run appropriate JAVA applets 32. Once the applets start, the web browser communicates with the object server 25 through the interface 26 to perform initialization and to request initial configuration and status information that is appropriate for the current requested view. The JAVA applets 32 then registers with the object server 25 for subsequent notifications of changes to configuration and status that it requires to keep the view up to date. The client may perform commands to request various maintenance operations on the network element 28. These commands are converted into appropriate requests through the interface 26 and perform operations on the object server 25. The commands are then translated into SNMP and are transmitted to the network element 28 through the SNMP library 33.

Acknowledgments and command responses from the network element 28 are transmitted through the SNMP library 33, are converted to events by the object server 25 and transmitted to originating JAVA applets 32 through the use of callbacks defined by the interface 26.

Client applications communicate with the web server 28 via the interface 26 in accordance with the invention, to the element manager through a distributed object request architecture such as CORBA. The interface 26 provides a constant interface to all managed objects in the network, and hides the implementation details associated with the element manager platform.

Figure 2:
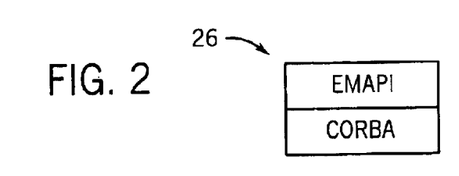
FIG. 2 is a functional block diagram of the translating interface shown as only a single block in FIG. 1.

Referring to FIG. 2, the interface 26 (EMAPI) is the definition of objects, attributes and operations that comprise the protocol used between client applications and the server to manage network elements. The EMAPI uses the industry standard CORBA to provide distribution of the objects and their operations and to allow for the implementation of the client and server to be in different programming languages and on different computer architectures.

The client interface to the server and the managed object attributes is described in the interface 26 and managed object notation provides a consistent model of all managed objects in the network, hiding the implementation details associated with the element manager platform from client applications, thus clients do not need to know the underlying protocol to the network elements. Managed objects specific logic is encapsulated within the managed object instead of scattered throughout various applications thus simplifying client application development.

Each physical, selected non-physical and logical component in the network is modeled as a managed object, which the Server makes visible to distributed client applications through the facilities of the Common Object Request Broker Architecture (CORBA). EM clients need only be concerned about the attributes and operations defined for each application managed object, and not the details of network-level protocol and the server infrastructure required to support object services.

Figure 3:
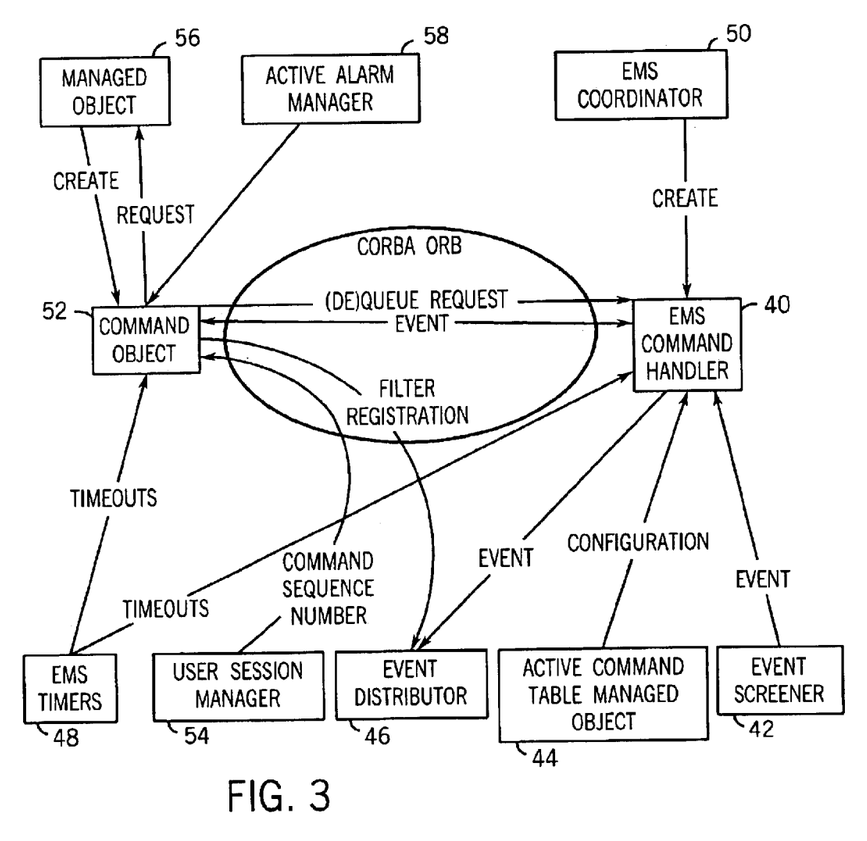
FIG. 3 is a functional block diagram illustrating the interface with the controlled network element that is visible to the object oriented client management application at the work station of FIG. 1.

FIG. 3 illustrates all of the interfaces visible to client applications which do not depict process or processor boundaries, which are made transparent by the client and server object request brokers (ORBs). Application services are provided through object interfaces formally defined in the CORBA Interface Definition Language (IDL).

Referring to FIG. 3, an EMS command handler 40 is interfaced with an event screener 42, an active command table managed object 44, an event distributor 46, EMS timers 48, an EMS coordinator 50 and the command object 52. A user session manager 54 interfaces with the command object 52 to provide to provide it with command sequence number. The command object 52 also interfaces with a managed object 56 and an active alarm manager 58. The application programming interface (API) and protocol provides for efficient communication between a distributed client application and an element management server independent of the communication protocol to the network element. For more information regarding management of such a telecommunication network element reference should be made to the pending patent applications noted above and incorporated by reference.

The Element Management Application Programming Interface (EMAPI) provides benefits over known management systems. Efficient use is obtained through use of low bandwidth connections. Client applications register for network element information they wish to track and after an initial set of data only receive incremental updates (deltas) when there are changes. There is centralized polling of attributes; attributes are only polled if a client exists that has registered to monitor the attribute. If multiple clients register for the same attribute(s), the polling is not repeated for the clients-only a single polling cycle is performed.

In accordance with the EMS command structure, a command is issued, and an acknowledgment is returned within ten seconds indicating if the command was accepted or rejected (or if no response was received). Upon completion of the command, a sequence of command responses, one or more, are returned indicating the result of the command.

The EMS command handler design provides an infrastructure that can support the simple command sequence described above along with an ability to chain commands together in a hierarchy where the execution of some commands depends on the result of other/previous commands (called complex commands). The EMS command handler 40 support command execution in a distributed environment. Commands can be composed in a different process or processor (utilizes CORBA for communication). Commands are composed in EMAPI notation and are therefore independent of the protocol used between the manager and the target with an SNMP protocol. The EMS command handler also supports construction of complex or hierarchical commands where several independent commands can be chained together to allow conditional execution based on the results of each command in a sequence of commands.

Still referring to FIG. 3, the EMS command architecture is composed of two major parts. The first is the command handler 40, which coordinates the processing of commands. The second component is the command object 52 that contains the information necessary to perform a command. Command handling could be viewed to start from user input and end with visible output, but here is defined to begin with the managed object method associated with some maintenance operation invoked by the user via text or GUI-based interaction. In the EMS, a managed object 56 exists to represent each type of equipment within the network element 38 and contains operations that represent the various commands that can be performed. For example, if the managed network element were a radio transmitter, there might be a managed object defined called "Amplifier" that had operations defined such as "Remove" or "Restore" to change the maintenance state of that unit. The EMS provides a user interface that takes either text input or mouse selection to perform the operation. The discussion begins with the operation in the managed object and proceeds through the command handler. FIG. 3 shows the interfaces between EMS sub-components involved in command handling. The components of FIG. 3 that perform the task of command handling are the command handler 40 and the command objects 52.

Figure 4:
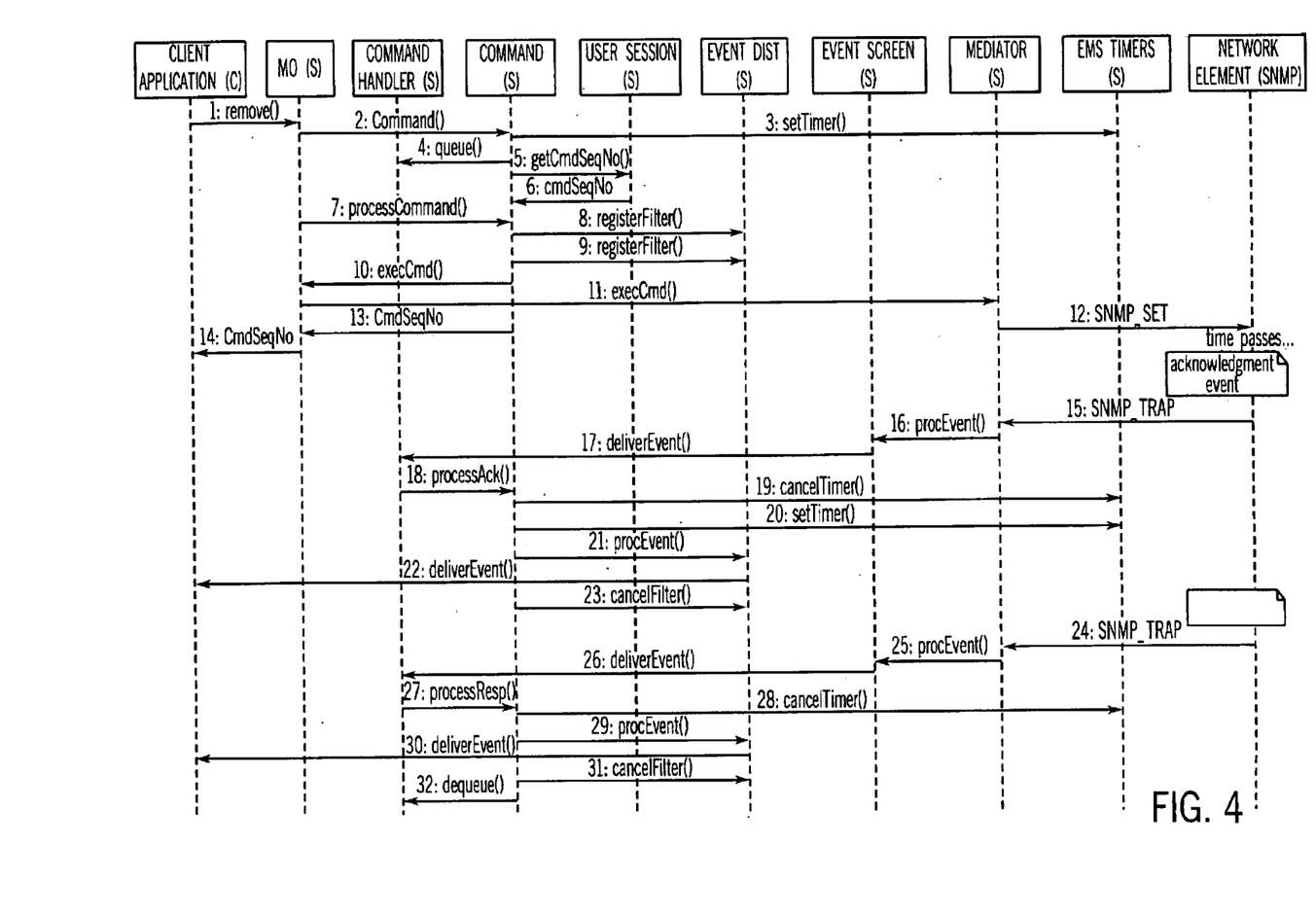
FIG. 4 is a graphic illustration of the sequence of activities that occur during an exemplary management session using the network management system of FIG. 1.
Figure 6:
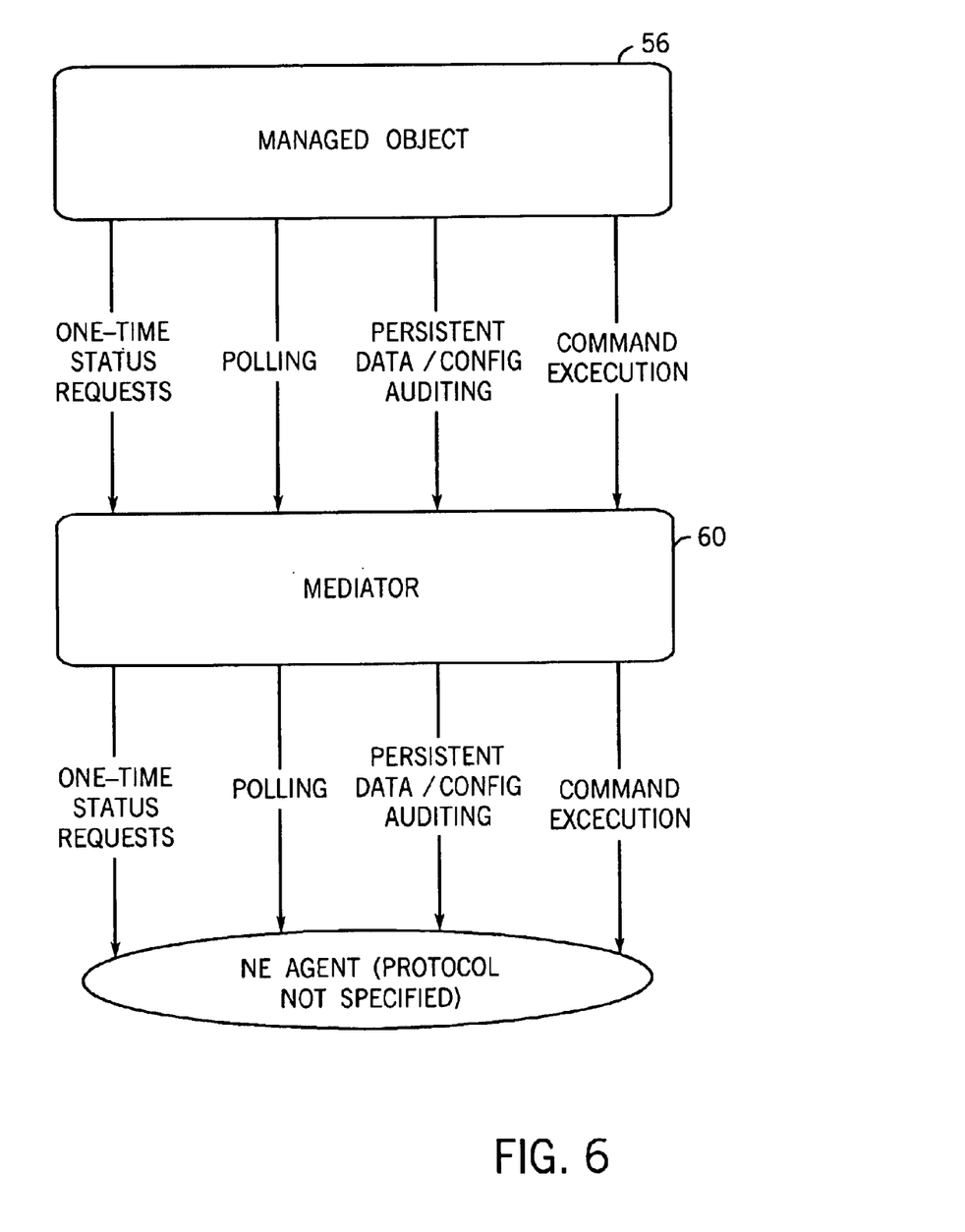
FIG. 6 is a simplified functional block diagram illustrating the interfaces provided between an EMAPI managed object that utilizes a protocol neutral interface with a MEDIATOR that performs the appropriate protocol conversion necessary for communication with the target network element.

Referring also to FIGS. 4, 5 and 6, he command handler 40 is created at EMS initialization time and stays up until the EMS is brought down. There is a single instance for all commands in the system, and it persists through the life of the system. A command object 52, however, is created in response to a user-issued request by managed objects 56 or by the active alarm manager 58, and lasts only as long as the command is active within the system. When a command object 52 is created, it requests to be placed in queue by the command handler 40. This is how the command handler is able to keep track of all the commands within the system. Also, during command object creation, the user session manager 54 assigns a unique command sequence number to each command.

Shortly thereafter, the command object 52 makes a request of the EMS MEDIATOR 60, FIG. 6, via a method of the managed object that created the command object, to translate the command into a protocol specific request in an implementation of SNMP, and transmits the command to the network element. Command acknowledgments and responses are delivered as events by the event screener 42 to the command handler 40. These originate from the network element as SNMP traps and are converted into EMAPI events by the MEDIATOR 60. They are then delivered to the event screener 42 where they are delivered to the command handler 40 because the command handler 40 informed the event screener 42 at system startup that all command related events should be directed to the command handler 40. The command handler 40 then routes the events to the appropriate command objects for processing. The original command information is then added back to each of the response events to allow for reporting of the original command with the responses.

The command handler 40 then passes the events on to the event distributor 42 for delivery to recipients that have registered for these events who is usually at the user interface where the command was input. The EMS timers 48 provide timing facilities to the command objects 52 for acknowledgment and response timing and to the command handler 40 for audit cycles. The command handler 40 periodically audits its list of commands against configuration information provided by the active command table managed Object(s) 44. This audit is needed because the deliver of command acknowledgments and responses is unreliable and a way is needed to manage resources should they not arrive.

To illustrate the invention, the following is a command handling scenario for a simple command. The most typical scenario involves a command that is routed through the EMS, across some sort of transport interface, to the agent for particular network element. The removal of a "radio amplifier" will serve as a high-runner example. For this kind of scenario, a command object 52 is instantiated with all the information that will be needed for the eventual communication with the agent. The command object to is directed to process the command, and in so doing, acquires the sequence number assigned to the command. The command object 52 then passes the number back to the invoking client process.

Because command objects 52 manage their own destruction, the instantiator, i.e., the managed object that is creating the command object, is then free of any further responsibility as far as this command is concerned.

During instantiation, the command object 52 binds to several CORBA service objects: the command handler 40, the event distributor 46, and the user session manager 54. The binding to the latter is temporary since the only thing needed from it is a command sequence number. The other bindings remain in effect for the life of the command object 52. A request is then made of the command handler 40 to enter this object in its queue. An EMS timers utility 48 is used to start timing for the receipt of an acknowledgment event.

When told to process the command, the command object does two things: it registers acknowledgment and response filters with the event distributor 46 on behalf of the client, and it passes information through the MO to the EMS MEDIATOR 60. The MEDIATOR is a SNMP MEDIATOR in this scenario, so that information can be sent off to the appropriate network element for eventual execution.

After some time passes, an acknowledgment trap arrives and enters the command handling domain as an event delivered to the command handler 40. The command identifier is included in the event data and used to obtain from the command queue a reference to the corresponding command object 52. With this reference, the command handler 40 is able to direct the command object 52 to process the acknowledgment event. The command object 52 appends the command block data sequence for the originating command which is passed in the command object constructor. The command constructor is the initialization function of the command object that is internal and performed once at the initial construction of the command object when the instantiator creates the command object. The command object constructor modifies the event data and passes the modified event data to the event distributor. This results in the distribution of the event back to the client. Once this happens, the command object 52 frees the acknowledgment event filter. The event filter is Part of the registration that the command object performs on behalf of the instantiator. The event filter cancels the acknowledgment timer, and starts a response timer of the EMS timers 48.

There may be one or more response events, and they are handled the same way as acknowledgment events. After the final response event is processed (indicated in the event data), the command object 52 cancels the response timer, frees the response event filter, requests to be removed from queue by the command handler 40, and releases all bindings to CORBA service objects. It finishes by deleting itself.

As noted above the system of the present invention supports complex commands. A complex command is one that, from the client's perspective, is a single operation, but to the EMS, translates into more than one suboperation. Each suboperation is a command in itself. The suboperations may be executed in parallel or in series or in any combination of the two, depending on the needs of the suboperation. An example of a complex command might be the conditional removal of a network element. But before the element is removed, an attempt is made to remove each of it's subunits. If the removal of any subunit fails, then all subunits removed to that point are restored and the overall operation fails.

Complex commands are supported by two variations of command objects 52. The parent command object 52 corresponds to the user's single operation. Child command objects correspond to the suboperations. Since the infrastructure cannot have a priori knowledge of the interrelationships between suboperations, the established behavior is to execute all suboperations in parallel with no other coordination between them. Where this is inappropriate, new classes can be derived from the parent command class with the required customization implemented.

The following describes an exemplary scenario of the design of the stock, or default, complex command. The parent command object 52 must be instantiated first. Ensuing activities are the same as described for simple commands. The instantiator must then request the command sequence number from the parent so that it can pass it in the child command constructor as each child is then instantiated.

Child command instantiation is the same as for simple commands except that the child obtains its parent's address from the command handler. With this address it is able to inform its parent of its existence, and the parent adds a reference to the child in its list of children. In this way, after all child commands are created, each knows its parent, and the parent knows about all of its children; this knowledge is critical for the communication that must take place between parent and child during the processing of a complex command.

From the perspective of the instantiator, processing a complex command after all this instantiation is no different than processing simplex commands. The instantiator requests that the parent command process the command, and after that, can go on to other things.

The processing by the parent command of a complex command entails the registration of acknowledgment and response event filters on behalf of the client, followed by a request made to each of its children to process its own subcommand. The parent makes no request that results in communication with the network element (via the MEDIATOR 60).

The child command's processing of a command is the same as for simplex commands except that no filter registration is done. The parent's filters are adequate to handle all events for the complex command.

An acknowledgment event will be delivered eventually to each child command. When the child receives the acknowledgment, it reports it to its parent, cancels its acknowledgment timer, and sets a response timer of the EMS timers 48. The parent command on receiving the first acknowledgment report, cancels its acknowledgment timer, sets a response timer, generates an in-progress acknowledgment, processes that event, and sends it to the event distributor 46 for delivery back to the client. It then collects the rest of the acknowledgment reports of the child commands with no further action until the last child report is in. At that time, if no responses are expected from the child commands, a final response event is generated and cleanup procedures commence. The success or fail status encoded in the response is determined by the combination of acknowledgments reported to the parent.

Response events are delivered to their corresponding child commands. The child adds its own command information to the event data but sets the command identity to that of the parent command. It modifies the result sequence number by asking the parent for the next one. Responses from different children can be mixed. If the final response indicator is set, the child unsets it and cancels its response timer. It passes the event to the event distributor 46 for delivery to the client. If this was the final event, it informs the parent of that fact. The parent command keeps track of the status of all final responses reported by its children. When the last one is reported, it cancels its response timer and generates a final response event. If any of its children reported a failure response, this event will reflect failure; otherwise, it will reflect success. It processes the final response and sends it to the event distributor for delivery to the client.

Complex command destruction, or cleanup, begins after generation of the final response. The parent releases the two event filters and then requests that each child begin its cleanup procedures. It then frees up its list of children, requests to be removed from the queue by the command handler 40 and deletes itself. Each child cleans up by requesting to be removed from the queue by the command handler 40, and then by deleting itself.

Figure 7:
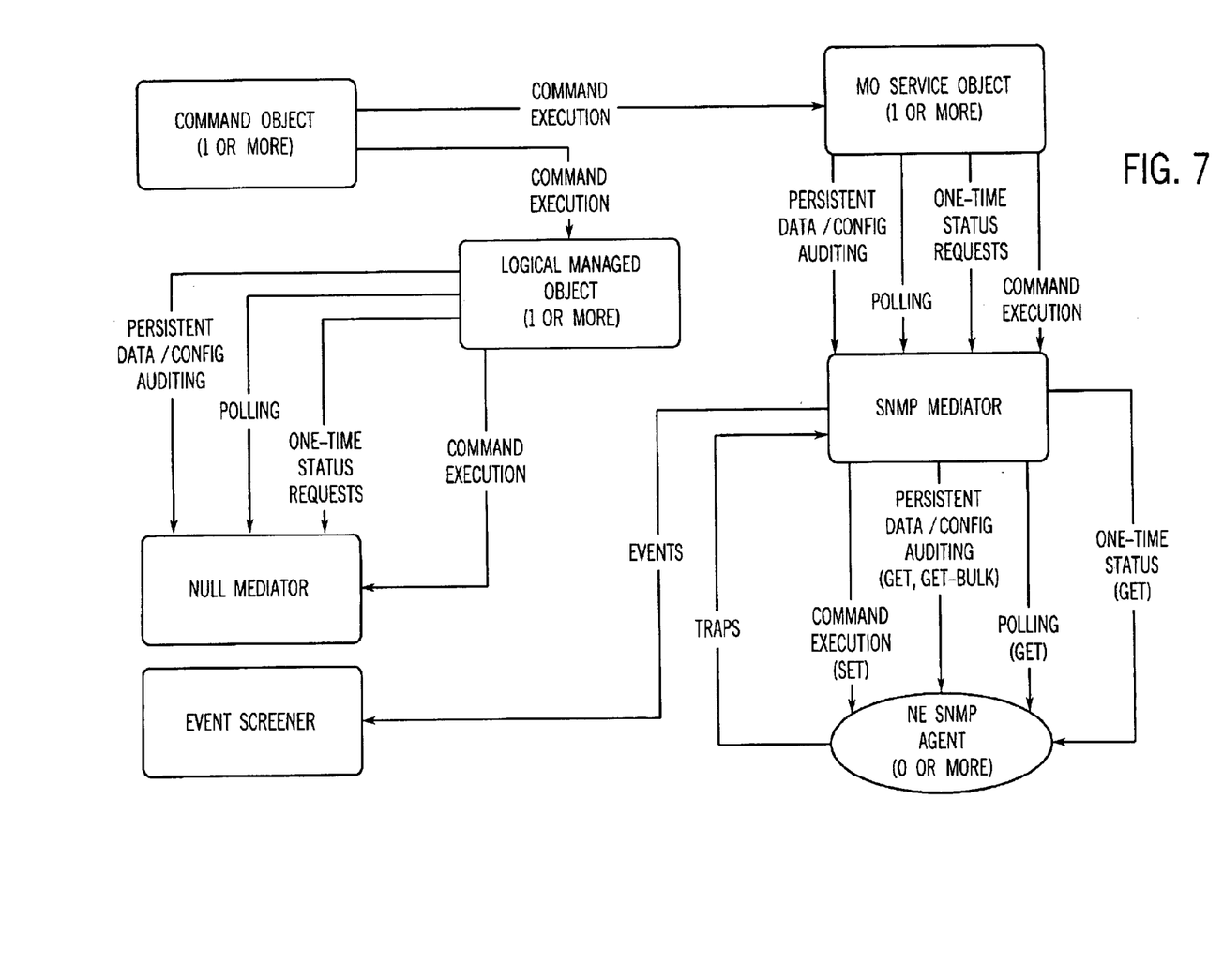
FIG. 7 is a functional block diagram illustrating a specific application of the protocol MEDIATOR of FIG. 6 in which an interface is provided between an SNMP MEDIATOR and an SNMP agent on a network element.

Referring to FIGS. 6 and 7, the MEDIATOR 60 provides a network element protocol independent interface for the EMAPI. This allows for easy integration of new MEDIATORs to perform necessary protocol conversion when adding support for new network elements. FIG. 6 shows the interface between a representative, or abstract, managed object 56 and an exemplary, or abstract, MEDIATOR 60, along with the corresponding implied interface between the abstract MEDIATOR 60 and an abstract network element 38 with which it could communicate. No protocol is specified as this interface as the system is intended to be protocol-neutral.

Figure 8:
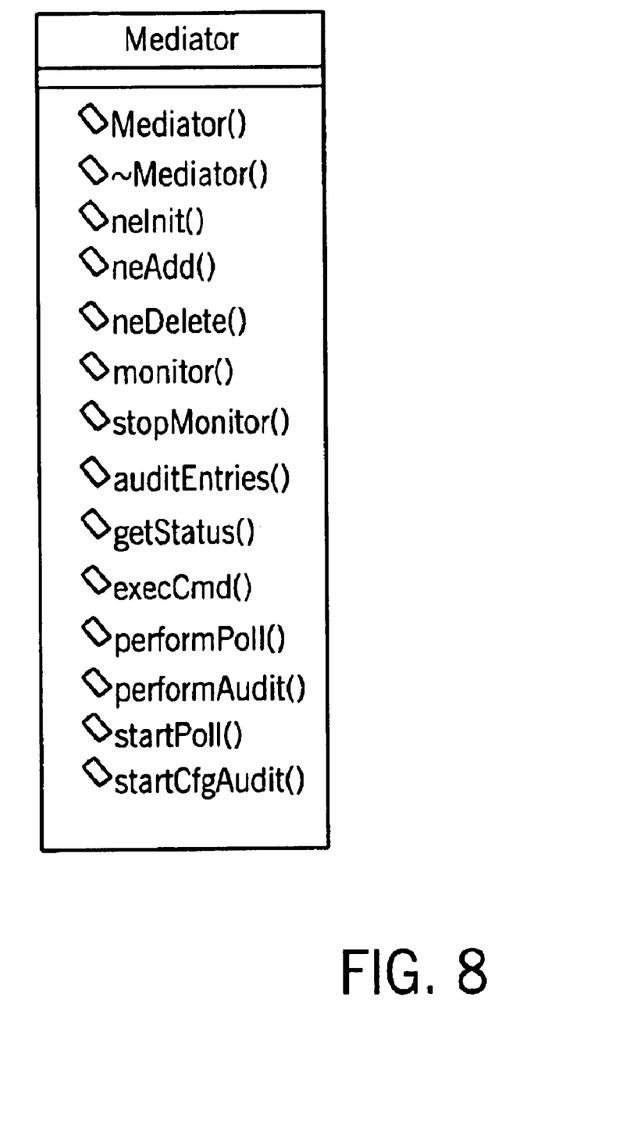
FIG. 8 is a diagram describing the interfaces provided by the abstract MEDIATOR of FIG. 6

The diagram of FIGS. 7 and 8 describes the interfaces provided by the abstract MEDIATOR 60. All EMAPI managed objects utilize these protocol neutral interfaces. Specialized MEDIATORs then perform the appropriate protocol conversion necessary for communication with the target network element.

The methods of the MEDIATOR 60 define its interface.

---

• MO_i:
An MO_i object has access to a number of MEDIATOR
  interfaces. They are shown below. The signatures of
  these methods are shown as an introduction to the
  specifics of the interface. Lower-level detail about how
  the arguments to these methods are used is given in later
  sections of the document.
// Request to poll selected attributes of a managed object
instance.
// Note that each subsequent request for a given object
  instance
// supersedes all prior requests since the complete
  attribute bitmask
// is provided in each status entry.
virtual void    monitor(const Oid&           ne,
                       const Oid&            mo,
                       MO::SeqAttrCodeValue* keyList,
                       const RWBitVec&       attrMask)
= 0
// request to stop polling for any attributes of a specified
    managed
// object instance
virtual void    stopMonitor(const Oid& ne, const Oid& mo) =
    0;
// process request to perform periodic audit of agent
    configuration
// information
virtual void    auditEntries(const Oid&      ne,
                            AttrTransEntry*  tblCnt,
                            ClassTransEntry&
    moClassTrans,
                            const RWBitVec&
    auditMask) = 0;
// one-time request to get any status for a managed object
    instance
virtual void    getStatus(const Oid&         neOid,
                         const Oid&          moOid,
                         ClassTransEntry&
    moClassTrans,
                         MO::SeqAttrCodeValue*
    indexList,
                         const RWBitVec&     reqMask,
                         int
    numReqAttr,
                         StatusCB_ptr        callback)
    = 0;
// Execute specified command on NE
virtual void    execCmd(const Oid&           neOid,

---

ClassCode
    cmdClassCode,
                       const MO::SeqAttrCodeValue&
    cmdParm,
                       const CmdId&          cmdId)
= 0;
// network element initialization: create a new entry in the
// NE definition list
virtual void    neInit(ClassCode             neClass,
                      const MO::AttrCode     isolationAttr,
                      const ProtocolView&    protocolView,
                      const MOview&          moView) = 0;
// network element instance addition:
//
// - retrieve host address for specified host name and
    create new
// entry in the corresponding NE definition host list
//
// - create new entry in registered network element list
virtual void    neAdd(const Oid&             ne,
                      const char*            hostName)= 0;
// network element instance deletion--delete host address
    from
// corresponding NE class definition, and delete associated
// registered NE list entry
virtual void    neDelete(const Oid&          ne) = 0;
• EmsTimers:

The following methods are static members of MEDIATOR 60 and serve as callbacks which are invoked by EmsTimers 48 whenever the periodic configuration timer and the periodic polling timer, respectively, expire. Their signatures are shown as an introduction to the specifics of the interface. Lower-level detail is presented later in this document.

---

// initiate configuration audit for each registered network
    element
// (conforms to ActionFunc prototype as specified by
    EmsTimers)
static void     startAudit(void *);
// initiate next polling cycle for each registered network
    element
// (conforms to ActionFunc prototype as specified by
    EmsTimers)
static void     startPoll(void *);

---

FIG. 7 shows a more specific application of the protocol MEDIATOR where the abstract Managed Object and MEDIATOR have been replaced by the more derived SNMP and Logical variants. In this figure, the interface between an SNMP MEDIATOR interface and an SNMP Agent on a Network Element is shown.

The SNMP MEDIATOR, as the name suggests, implements the MEDIATOR interface for the purpose of mediating between Managed Objects and Network Elements via SNMP. The NULL MEDIATOR implements the MEDIATOR interface for the purpose of supplying to logical Managed Objects the MEDIATOR interface but with no back-end protocol mediation While a particular embodiment of the invention has been disclosed for purposes of illustrating the invention, it should be appreciated that the scope of the invention is not limited to the details of this embodiment but rather is defined by the appended claims.

Glossary

Alarm The description of an alarmed notification.
Attribute A property of a managed object (e.g. alarm state).
Attribute An integer value which uniquely identifies an
Code attribute of a given managed object.

Class Code An integer value which uniquely identifies a managed object class.
Configuration Generic term which has one of two meanings Information depending on its context:
  With respect to a manged object class, this term applies to the identification of all instances of the class, either for a specific network element or for all network elements in the system. With respect to a managed object instance, this term may apply to one or more attributes which are associated with database values, such as the primary/alternate role of a duplex component.
CORBA Common Object Request Broker Architecture
EMAPI Element Management Application Programming Interface
EMS Element Management System
Event The description of a spontaneous occurrence, such as alarm notification, command acknowledgment or configuration change.
Instance An integer value which uniquely identifies an
Identifier instance of a given managed object.
Interface Generic term for distributed service request. The Operation target method may be defined in the Element Management Application Programming Interface (e.g. status registration) or in an application-specific derivation of a managed object (e.g. command execution).

What is claimed is:

1. In a telecommunications network having a plurality of network elements, the improvement being a distributive network management system for remotely managing the plurality of network elements, comprising:
   a management computer with a management program and means for enabling communications through the Internet by the management program of one or more parent commands; and
   an element management server on the computer Internet with at least one managed object in communication through the computer Internet with the plurality of network elements via a simplified network management protocol to communicate management information concerning the plurality of network elements;
   wherein the element management server processes a chain of commands that comprise a parent command of the one or more parent commands and one or more suboperations;
   wherein the at least one managed object comprises a parent command object, wherein the element management server creates the parent command object upon receipt of the parent command from the management computer, wherein upon creation of the parent command object, the element management server communicates one or more of the one or more suboperations with the plurality of network elements to provide the management information to the management program and to take actions as directed, such that said plurality of network elements thereby comprise managed network elements.

2. The telecommunication network of claim 1 in which the parent commands and the one or more of the one or more suboperations are composed in EMAPI notation to render them independent of any protocol used between the element manager and the managed network elements.

3. The telecommunication network of claim 2 in which the managed network elements employ an SNMP protocol.

4. The telecommunication network of claim 3 in which communications between the management computer and the element manager server utilizes CORBA.

5. The telecommunication network of claim 2 in which the managed network elements employ an SNMP protocol.

6. The telecommunication network of claim 5 in which communications between the management computer and the element manager server utilizes CORBA.

7. The telecommunication network of claim 1 in which the managed network elements employ an SNMP protocol.

8. The telecommunication network of claim 1 in which the managed network elements employ an SNMP protocol.

9. The telecommunication network of claim 8 in which communications between the management computer and the element manager server utilizes CORBA.

10. The telecommunication network of claim 1 in which communications between the management computer and the element manager server utilizes CORBA.

11. The telecommunication network of claim 10 in which the managed network elements employ an SNMP protocol.

12. The telecommunications network of claim 1 in which the element management server includes means for automatically polling the plurality of network elements for status information associated with the parent command object.

13. The telecommunications network of claim 12 which the means for polling includes means for communicating with the plurality of network elements via the simplified network management protocol.

14. The telecommunications network of claim 1 in which the element network management server includes means for converting the parent command received from the management computer into corresponding set commands of the simplified network management protocol.

15. The telecommunications network of claim 1 in which the element management server includes an event distributor for providing filtering, routing and distribution of simplified network management protocol traps, commands, command acknowledgments and command responses.

16. The telecommunications network of claim 1 including a logical managed object representative of a plurality of managed objects including the parent command object and which is not directly related to any of the plurality of network elements.

17. The telecommunications network of claim 1 in which the element management server includes means for managing user sessions including means for maintaining a list of active client sessions when the management computer is actively communicating with the element management server.

18. The telecommunications network of claim 1 in which the element management server includes means for managing user sessions including means for maintaining audits for user sessions that have terminated without communication of alarm notifications to the management computer.

19. The telecommunications network of claim 1 in which the element management server includes an alarm manager for providing an indication of current active alarms within the plurality of network elements.

20. The telecommunication network of claim 1 in which the element management server includes means for providing read-only access and change notification to a management information data base associated with an application processor of a network element being managed.

21. The telecommunications network of claim 1 in which the element management server includes an element manager application program interface employing an interface description language to provide an interface to managed objects of the management program that functions independently of the simplified network management protocol.

22. The telecommunications network of claim 1 in which the element management server includes a locale text formatting service for providing support for multiple human text base language communication from the management computer.

23. The telecommunication network of claim 1 in which the element management server has a plurality of managed objects including the parent command object respectively associated with a plurality of different management functions.

24. The telecommunications network of claim 1 in which the element management server includes means for generating an interactive web page with a graphic user interface with the parent command object for transmission to and display at the management computer.

25. The telecommunication network of claim 24 in which the web page has a menu of individual maintenance unit command options.

26. The telecommunications network of claim 24 in which the web page includes a system status summary page for each managed network element.

27. The telecommunications network of claim 24 in which the web page includes a list of active alarms for the plurality of network elements.

28. The method of claim 27 in which the parent commands and the one or more of the one or more suboperations are composed in EMAPI notation to render them independent of any protocol used between the element manager and the managed network elements.

29. The method of claim 28 in which the managed network elements employ an SNMP protocol.

30. The method of claim 29 in which communications between the management computer and the element manager server utilizes CORBA.

31. The telecommunication network of claim 1, wherein the element management server communicates the one or more of the one or more suboperations with the plurality of network elements in a parallel manner.

32. The telecommunication network of claim 1, wherein the element management server communicates the one or more of the one or more suboperations with the plurality of network elements in a serial manner.

33. The telecommunication network of claim 1, wherein the one or more of the one or more suboperations comprise a first suboperation and a second suboperation, wherein the element management server sends a first acknowledgment message to the parent command object to begin the first suboperation;
    wherein the element management server obtains a response command from the parent command object upon completion of the first suboperation;
    wherein the element management server sends a second acknowledgement message to the parent command object to begin the second suboperation.

34. The telecommunication network of claim 1, wherein upon failure of a suboperation of the one or more of the one or more suboperations, the element management server communicates a failure message for the chain of commands to the management computer.

35. The telecommunication network of claim 1, wherein a first network element of the plurality of network elements employs a first protocol and a second network element of the plurality of network elements employs a second protocol;
    wherein the element management server employs a mediator to translate the managed object commands into the protocol of the network elements to allow the managed object to communicate with the first and second managed network elements.

36. In a telecommunications network having a plurality of network elements, the improvement being a method for remote distributive network management of the plurality of network elements, comprising the steps of:
    communicating through the Internet between a management program of a management computer by means of object commands with an element management server;
    processing a chain of commands that comprise a parent command and one or more suboperations with the element management server;
    creating a parent command object upon receipt of the parent command from a management computer;
    communicating by means of an element management server on the computer Internet with the parent command object with the plurality of network elements via a simplified network management protocol to communicate management information concerning the plurality of network elements; and
    responding with the one or more of the one or more suboperations to the parent command from the management computer to provide the management information to the management program and to take actions as directed with respect the network elements.

37. The method of claim 36 in which the managed network elements employ an SNMP protocol.

38. In a telecommunications network having a plurality of network elements, the improvement being a method for remote distributive network management of the plurality of network elements, comprising the steps of:
    receiving and storing at a network server a chain of commands that comprise a parent command, a first suboperation, and a second suboperation;
    creating a parent command object upon receipt of the parent command from a management computer;
    sending a first acknowledgment message to the parent command object to begin the first suboperation;
    obtaining a response command from the parent command object upon completion of the first suboperation at a network element; and
    sending a second acknowledgement message to the parent command object to begin the second suboperation at the network element;
    wherein said network server with said parent command object in communication through a computer Internet with the plurality of network elements via a simplified network management protocol to communicate management information concerning the plurality of network elements.

39. In a telecommunications network having a plurality of network elements, the improvement being a distributive network management system for remotely managing the plurality of network elements, comprising:
    a management computer with a management program and means for enabling communications through the Internet by the management program of one or more parent commands; and
    an element management server on the computer Internet with at least one managed object in communication through the computer Internet with the plurality of network elements via a simplified network management protocol to communicate management information concerning the plurality of network elements;
    wherein the element management server processes a chain of commands that comprise a parent command of the one or more parent commands and one or more suboperations;
    wherein the at least one managed object comprises a parent command object, wherein the element management server creates the parent command object upon receipt of the parent command from the management computer, wherein upon creation of the parent command object, the element management server communicates one or more of the one or more suboperations with the plurality of network elements to provide the management information to the management program and to take actions as directed, such that said plurality of network elements thereby comprise managed network elements;

wherein the element management server includes means for automatically polling the plurality of network elements for status information associated with the parent command object.

* * * * *